US007958040B2

(12) United States Patent
Jain et al.

(10) Patent No.: US 7,958,040 B2
(45) Date of Patent: Jun. 7, 2011

(54) ONLINE COMPUTATION OF MARKET EQUILIBRIUM PRICE

(75) Inventors: Kamal Jain, Bellevue, WA (US); Kunal Talwar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 11/145,051

(22) Filed: Jun. 3, 2005

(65) Prior Publication Data

US 2006/0277135 A1   Dec. 7, 2006

(51) Int. Cl.
  *G06Q 40/00*   (2006.01)
  *G06Q 30/00*   (2006.01)
(52) U.S. Cl. .............................. 705/37; 705/14.71
(58) Field of Classification Search ............ 705/14.71, 705/37
  See application file for complete search history.

(56) References Cited

U.S. PATENT DOCUMENTS

| 5,890,138 | A | * | 3/1999 | Godin et al. ............ 705/26 |
| 6,026,383 | A | * | 2/2000 | Ausubel ............... 705/37 |
| 7,035,812 | B2 | * | 4/2006 | Meisel et al. ............ 705/14 |
| 7,058,602 | B1 | * | 6/2006 | La Mura et al. ......... 705/37 |
| 7,177,832 | B1 | * | 2/2007 | Semret et al. ........... 705/37 |
| 2002/0052828 | A1 | | 5/2002 | Ausubel |
| 2002/0116313 | A1 | | 8/2002 | Detering |
| 2004/0133526 | A1 | * | 7/2004 | Shmueli et al. ......... 705/80 |
| 2004/0205013 | A1 | * | 10/2004 | DeLaCruz ............. 705/37 |
| 2006/0069637 | A1 | * | 3/2006 | Lutnick et al. .......... 705/37 |

OTHER PUBLICATIONS

Lawrence M. Ausubel, An Efficient Ascending Bid Auction for Multiple Objects, Dec. 2004, The American Economic Review, vol. 94, No. 5, pp. 1452-1475.*
Abington, The Hutchinson Unabridged Encyclopedia with Atlas and Weather guide, 2008, Helicon Publishing, Dutch auction.*
Unknown, The Penguin Dictionary of Economics, 2003, Penguin, Vickrey, William.*
Unknown, The Penguin Dictionary of Economics, 2003, Penguin, auction.*
Unknown, Ubid.com, various the latest being 2002, Internet Archive, 1-14.*
PCT International Search Report and PCT Written Opinion of the International Searching Authority for International application No. PCT/US 06/19476 mailed Jan. 16, 2007, 9 pages.

* cited by examiner

*Primary Examiner* — Kirsten S Apple
*Assistant Examiner* — Scott S Trotter
(74) *Attorney, Agent, or Firm* — Lee & Hayes, PLLC

(57) ABSTRACT

Auction prices for a quantity of items, the quantity of which is not determined prior to auction, are equilibrated among bidders to reflect supply and demand for the items. For example, in auctioning Internet advertising opportunities, the first available opportunities are auctioned to a high bidder. Later in the course of the auction period, once the high bidder's budget has been exhausted, the price for advertising opportunities is reduced. The difference in price paid by the high bidder and the reduced price for the quantity of advertising opportunities purchased is credited to the high bidder's account. Once the high bidder's account regains a level sufficient to acquire additional advertising opportunities, the high bidder may continue to acquire advertising opportunities. Other bidders similarly are credited the difference between prices previously paid and the current price. An equilibrium price is reached based on the recursive adjustment of prices paid by the bidders.

12 Claims, 8 Drawing Sheets

510

| BIDDER | BID | BDGT | IMPR | PRC |
|---|---|---|---|---|
| BIDDER A | 8.0¢ | $300 | 5,000 | 6.0¢ |
| BIDDER B | 6.0¢ | $180 | 3,000 | 6.0¢ |
| BIDDER C | 2.0¢ | $100 | 0 | - |

| BIDDER | BID | BDGT | IMPR | PRC |
|---|---|---|---|---|
| BIDDER A | 8.0¢ | $300 | 15,000 | 2.0¢ |
| BIDDER B | 6.0¢ | $180 | 9,000 | 2.0¢ |
| BIDDER C | 2.0¢ | $100 | 1,000 | 2.0¢ |

| BIDDER | BID | BDGT | IMPR | PRC |
|---|---|---|---|---|
| BIDDER A | 8.0¢ | $300 | 6,000 | 5.0¢ |
| BIDDER B | 6.0¢ | $180 | 3,600 | 5.0¢ |
| BIDDER C | 2.0¢ | $100 | 0 | - |

*FIG. 5C*

| BIDDER | BID | BDGT | IMPR LIMIT | PRC | IMPR | COST |
|---|---|---|---|---|---|---|
| BIDDER A | 8.0¢ | $300 | 4,000 | 6.0¢ | 4,000 | $240 |
| BIDDER B | 6.0¢ | $180 | 3,000 | 6.0¢ | 3,000 | $180 |
| BIDDER C | 2.0¢ | $100 | - | - | 0 | - |

*FIG. 7A*

| BIDDER | BID | BDGT | IMPR LIMIT | PRC | IMPR | COST |
|---|---|---|---|---|---|---|
| BIDDER A | 8.0¢ | $300 | 4,000 | 2.0¢ | 4,000 | $80 |
| BIDDER B | 6.0¢ | $180 | 3,000 | 2.0¢ | 3,000 | $60 |
| BIDDER C | 2.0¢ | $500 | - | 2.0¢ | 20,000 | $400 |

*FIG. 7B*

ONLINE COMPUTATION OF MARKET EQUILIBRIUM PRICE

BACKGROUND

It is well understood that the Internet has revolutionized how goods and services may be bought, sold, and advertised. The Internet makes it easy for users to find information about goods or services in which they may be interested. A person wanting to learn about a particular provider of goods and services, even if the person does not know the web site address for the provider, can easily locate the desired information using Internet search engines. Moreover, if the person wants to research particular goods or services rather than particular providers, users can retrieve the information they want using the same search engines.

However, providers of web services such as search engines, web-based mail, on-line reference sources, and other services also provide opportunities for providers of goods and services to identify potential customers. Internet search engines, to take just one example, not only allow would-be consumers to view information about providers, but also allow providers to present themselves to people indicating interest in what they sell based on the searches these people conduct.

For example, FIG. 1A shows a search engine web page 100 that allows a person to perform a web search. To perform the search, the person enters one or more searched terms in search field 102, then "clicks" on a search button 104 by directing a pointing device (not shown) over search button 104 and pressing a button on the pointing device. In this particular example, the user has chosen to perform a search 106 consisting of the term "Camera."

As shown in FIG. 1B, and as familiar to most Internet users, the search engine returns a result screen 150 listing links 152 to web pages relevant to the user's search. Links 152 are presented and ranked according to their relevance to the search 106 (FIG. 1A).

However, links 152 are not all that is presented on results screen 150. Results screen 150 also includes advertisements 154, 156 and 158. Banner ad 154, displayed prominently across the top of results page 150, bears an advertisement for "BOB'S CAMERA OUTLET." Banner ad 156, displayed aside of results screen 150, presents a banner ad for "DISCOUNT CAMERAS." On another side of results screen 150, a list of sponsored links 158 is presented. Sponsored links 158 are links relevant to the user's search. However, sponsored links 158, like banner ads 154 and 156, appear not because of their particular relevancy to the search, but because providers have paid for their ads and or links to appear on this page. Pop-up windows (not shown) which present another window over search results window 150 also may be used to present advertisements.

Advertisers sponsoring advertisements 154, 156 and 158 pay the providers of search engine web page 100 to present their advertisements on search results page 150 when a user uses particular terms in his or her search that relate to the advertisers' goods and services. Typically, advertisers may pay the search engine provider each time one of their advertisements is presented. In Internet based advertising, these presentations of advertisements are termed "impressions." Alternatively, advertisers may agree to pay the search engine provider each time that a person actually clicks on one of their advertisements to navigate to the advertiser's web site. As another alternative, advertisers may pay the search engine provider based on "an effective click-through rate" or "ECTR." The effective click through rate is determined based on how many impressions of the advertisers advertisements are presented multiplied by an historic click through rate. The historic click through rate is determined by measuring what portion of impressions presented during a previous period of time resulted in users actually clicking on one of the advertiser's ads or links.

Advertising on the Internet offers a number of advantages. In contrast to mass media advertising, advertisements may be selectively presented to individuals who have expressed in an interest in a topic to which the advertiser's goods or services are related. In addition, advertising on the Internet does not require the kind of lead-time typically required to run an advertisement in print or broadcast media. Placement and timing of advertisements in print or broadcast media often are negotiated days or months in advance, resulting in a potentially long lag time in being able to advertise to potential customers. Again, by contrast, advertisements can be presented on the Internet in a matter of days or hours.

To further shorten the turnaround time to place advertisements on the Internet, web-based service providers may auction advertising opportunities to prospective advertisers, rather than negotiate individual agreements. Advertisers, such as advertisers behind ads 154, 156, and 158 (FIG. 1B), for example, bid to have their ads placed on search results page 150 when the search 106 includes the word "Camera." Depending on the format of the auction, the advertisers may bid for a certain quantity of impressions, a certain number of clicks, etc.

Once the bidding is closed, as advertising opportunities arise, web-based service providers review the bids and sell the advertising space and impressions to the advertisers offering the highest bids. If the bids are per click, the bids may be adjusted according to an historic click-through rate associated with each bidder. Adjusting the bids in this manner allows the provider to evaluate bids both on the size of a bid and the likelihood the bidder's ads actually will be clicked and, thus, generate income for the provider. Also, bidders may pay prices they actually bid or, depending on the format of the auction, the prices paid may be lower. For example, in a "Vickery Auction," the highest bidder is actually charged the price bid by the next highest bidder, or the "highest losing bid." The web-based service provider typically will continue to sell advertisements to the highest bidder until a predetermined budget specified by the bidder for the auction period is exhausted.

Flow diagram 200 of FIG. 2 shows a typical process by which advertisements are sold. Flow diagram 200 starts at block 202. At decision block 204, it is determined if an item, which in this example is an advertising opportunity triggered by an Internet user using a search term for which one or more advertisers have bid, is available for auction. If it is determined that no item has become available for auction, flow diagram 200 loops to decision block 204 until an advertising opportunity becomes available. Once an item is available for auction, at block 206, the highest bidder still having sufficient budget allocated to cover the current price of the item, is identified. Thus, if the budget of the highest bidder has been exhausted, the next highest bidder having sufficient budget to cover the current price of the item is identified, and so on.

Once a highest bidder having available budget is identified at block 206, at block 208, the item is sold to the identified bidder at the current price. As previously described, the current price might be the bidder's actual bid, the next highest bidder's bid, or some other price determined by the format of the auction. At block 210, the bid price paid is debited to the budget of the bidder. At decision block 212, it is determined if the auction continues. The auction may end at the end of the auction period, if there are no more possibilities of advertising spaces to sell, or if all the bidder's budgets have been exhausted. If it is determined at decision block 212 if the auction continues, flow diagram 200 loops to decision block 204 to await the availability of the next item for auction. On the other hand, if it is determined at decision block 212 that the auction will not continue, flow diagram 200 ends at block 214.

Unfortunately, the bidding process may prove to be seemingly unfair to would-be advertisers, and income collected by the web-based service providers may be erratic. FIGS. 3A through 3C illustrate examples of undesirable effects that may result from this bidding process. FIG. 3A shows a plurality of bids 300. A plurality of bids 300a-300n have been presented by BIDDER A 302a, BIDDER B 302b, BIDDER C 302c, through BIDDER N 302n. Bids 300a-300n also include unit bid prices 304a-304n and auction budgets 306a-306n set by bidders 302a-302n. For purposes of the examples of FIGS. 3A-3B, it is assumed that the unit bid prices are for each impression.

FIG. 3B illustrates a plurality of auction results 310 resulting from bids 310a-310c showing how many impressions 318a-318c resulted based on each bid. BIDDER A's auction results 310a show that its auction budget of $300 306a was expended on 3,750 impressions 318a at a bid price of 8.0¢ per impression 304a. BIDDER B's auction results 310b show that its auction budget of $180 306b was expended on 3,000 impressions 318b at a bid price of 6.0¢ per impression 304b. Strikingly, BIDDER C's auction results 310c show that its auction budget of $100 306c earned 5,000 impressions 318c at a bid of only 2.0¢ per impression 304c. It may be troubling to BIDDER A that BIDDER B earned nearly as many impressions with a much smaller budget. However, it is likely very troubling to BIDDER A that BIDDER C earned one-third more impressions with one-third the budget, and having paid a unit price of only one-fourth what BIDDER A paid. It also may be troubling to the seller that so many advertising opportunities were sold at such a relatively low price.

Thus, disappointed with auction results 310, in a subsequent auction BIDDER A may choose to lower its bid dramatically; however, the results may again prove disappointing. FIG. 3C shows a plurality of auction results 320 for a subsequent auction. BIDDER B maintained its bid at 6.0¢ per impression 322b, but increased its budget to $300 324b. BIDDER B's bid 322b resulted in BIDDER B earning 5,000 impressions 326b. BIDDER C, perhaps encouraged by its previous auction results 310c (FIG. 3B) increased its bid to 5.0¢ per impression 322c, and increased its budget to $200 324c. Despite increasing its bid, however, BIDDER C earned 4,000 impressions 326c, paying more for fewer impressions compared to the previous auction.

BIDDER A, perhaps disappointed in having paid much more to earn fewer impressions than BIDDER C in the previous auction, lowered its bid to 2.0¢ per impression 322a, and lowered its budget to $100 324a. Unfortunately, for BIDDER A, as a result of the varying supply of advertising opportunities, in this auction, BIDDER A earned zero impressions 326a.

As illustrated in the contrast between the examples of FIGS. 3B and 3C, bidders often are disappointed in auction results. Because of such unpredictable results, high bidders often feel cheated and decide to bid lower the next auction period. On the other hand, successful lower bidders may bid higher in hopes of even more success, or they may bid even lower hoping to save money. Both strategies, however, may fail.

Choosing how much to bid represents a strategic decision. However, no matter how much planning and strategizing goes into making the bids, the decision of what to bid is prone to error. Bidders may invest heavily in analysis and market research, yet still not be any more successful. This extra expense may cause bidders to lower their bids further, resulting in lower prices, and diminishing the income of the seller.

SUMMARY

An auction price is established for a quantity of items including such things as goods, services, opportunities to provide goods, and opportunities to provide services, where the quantity of items is not predetermined before the start of the auction. Bids are received from bidders, along with an account limit restricting each bidder's participation in the auction, such as a budget the bidders each are willing to invest in the auction. Initially, the auction price is based on at least one of a number of most desirable bids which, under the circumstances, may be a highest bid or a lowest bid. Alternatively, the auction price initially may be established based on one or more of the next most desirable bids.

The bidder presenting the most desirable bid is sold a plurality of items until that bidder's budget or other account limit is reached. Subsequently, the auction price is adjusted. For example, if the most desirable bid is the highest bid, the auction price is lowered. As the price is lowered, the bidder who presented the highest, most desirable bid receives rebates for each item purchased. Each rebate is equivalent to the price for which the item was purchased less the current price. As a result, because of the rebates applied, the bidders each will pay the same unit price per item purchased, thereby recursively adjusting prices based on the degree of supply and demand manifested over the course of the auction.

Eventually, credits received by one or more bidders may replenish their budgets, thereby allowing the bidders to acquire additional items. Additional items preferably are auctioned in order of which bidders presented the highest bids.

The items being auctioned may include advertisements presented via an Internet, such banner ads, pop-up ads, and sponsored links.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

FIGS. 5A-5C show results of auctions conducted in accordance with the flow diagram of FIG. 4.

FIGS. 7A and 7B show results of auctions conducted in accordance with the flow diagram of FIG. 6.

DETAILED DESCRIPTION

Equilibrating Prices to Charged to Bidders Based on Supply and Demand

Figure 4:
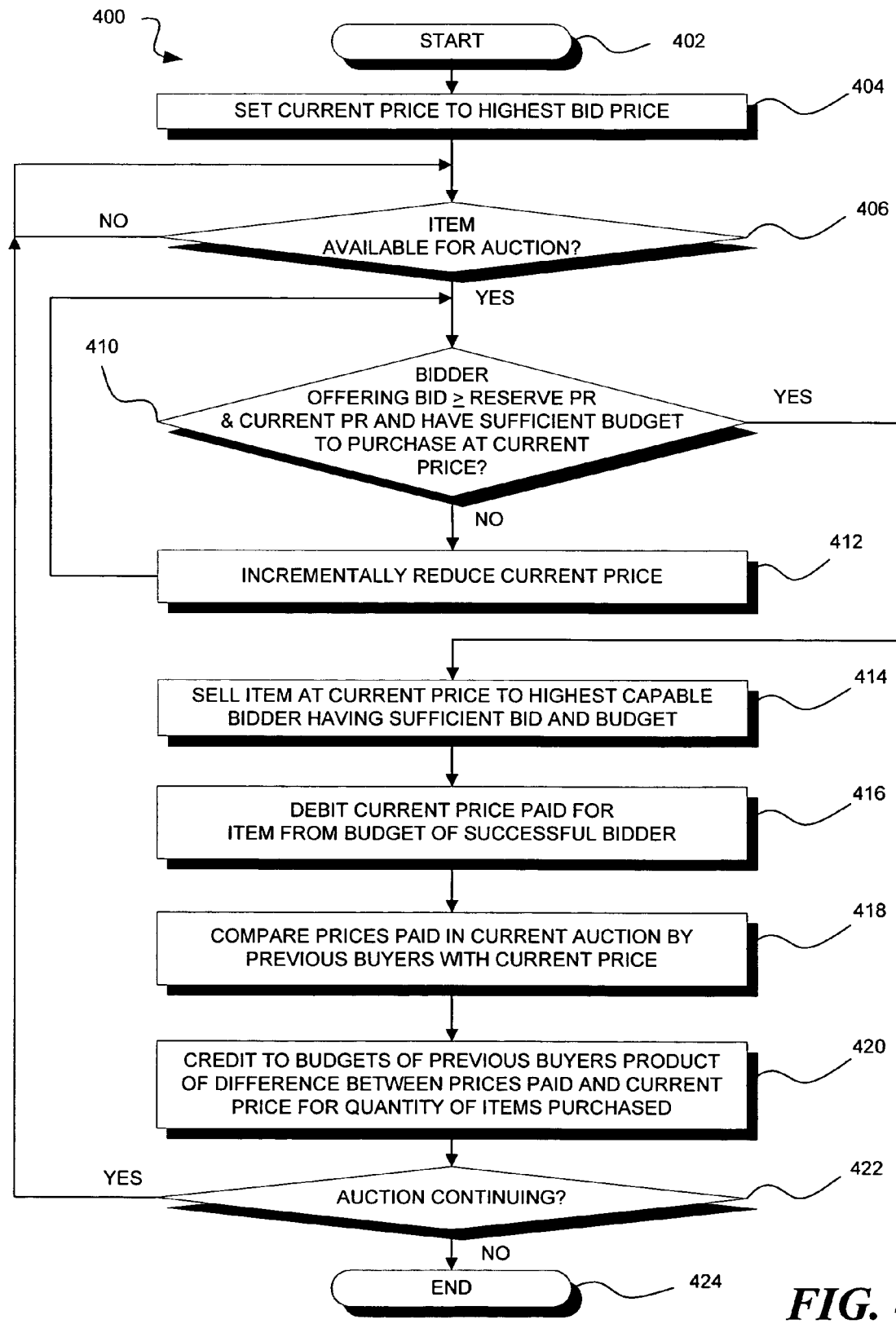
FIG. 4 is a flow diagram describing an exemplary embodiment for auctioning items where prices paid by sellers are equilibrated.

Flow diagram 400 of FIG. 4 shows a process for equilibrating auction prices paid by bidders so that all buyers are charged a price based on overall supply and demand for the auction items. Flow diagram 400 depicts an auction where the auctioning party is selling items, such as advertising opportunities or other goods and services, where a highest bid represents a most desirable bid from the perspective of the seller. However, auction prices paid by bidders may be similarly equilibrated in auctions where, for example, bidders are bidding on an opportunity to produce goods or services for the auctioning party. In such cases, from the perspective of the auctioning party, the most desirable bid will be the lowest bid.

Flow diagram 400 starts at block 402. At block 404, the current price to start the auction is set at the highest bid price. At decision block 406, it is determined if an item, for example is an advertising opportunity triggered by an Internet user using a search term for which one or more advertisers have bid, is available for auction. If it is determined that no item has become available for auction, flow diagram 400 loops to decision block 406 until an advertising opportunity becomes available.

Once an item is available for auction, at decision block 410, it is determined if there are bidders offering a bid at least as high as a minimum or reserve price set by the seller, if any, and the current price, and who also maintain a budget sufficient to purchase an item at the current price. If not, at block 412, the current price is adjusted to a less desirable price which, in this case, is a lower price. As will be further explained below, the current price is incrementally adjusted by a predetermined amount or adjusted to a next most desirable bid which, in this case, may be a next highest bid. Adjustments in price may be subject to some seller limitations. For example, as the price is adjusted to a less desirable price, the price may reach a reserve price below which the seller is not willing to auction further items. Once the price is adjusted at block 412, flow diagram 400 loops to decision block 410 to determine if there are bidders offering a bid at least as high as the current price while maintaining a budget sufficient to purchase an item at the current price.

Once it is determined at decision block 410 that there is at least one bidder having a sufficient bid and budget to purchase at the current price, at block 414 the item is sold at the current price to the highest bidder of the capable bidders having made a sufficient bid and having a sufficient budget of the capable bidders. At block 416, the current price paid for the item is debited from the budget of the successful bidder.

At block 418, the prices paid in the current auction by buyers of previously auctioned items are compared with the current price. At block 420, the budgets of buyers of previous items are credited the product of the difference between the prices these buyers paid for the items and the current price and the quantity of items purchased. As a result, at block 420, the prices paid by all the buyers to this point in the auction are equilibrated to reflect a price dictated by supply and demand up to this point of the auction. If the current price has not been adjusted to this point, there will be no credits to any buyers. However, if the current price has been adjusted, any buyers who purchased at higher prices effectively will have the prices they paid retroactively adjusted to the current price as a result of the credits to their budgets. Thus, each of the buyers to this point in the auction ultimately will pay the same price per item.

At decision block 422, it is determined if the auction continues. The auction may end, for example, when the auction period has ended, when there are no more items to be auctioned, when the budgets of all buyers have been exhausted, or the price has reached a limit or reserve set by the seller. If it is determined at decision block 422 that the auction continues, flow diagram 400 loops to block 406 to await the next item for auction. If it is determined that the auction will not continue, flow diagram 400 ends at block 424.

Although all buyers to this point effectively have paid the same price for the items, it should be noted that the highest bidders still had the first opportunity to purchase items. Therefore, bidders still may be encouraged to bid high in order to ensure opportunities to acquire what may be a limited supply of items. At the same time, these bidders are ensured that they will not pay a price that is disproportionate to what proves to be the market price.

In addition, according to another exemplary mode of the auction process, high bidders also have a first opportunity to acquire additional items with their replenished budgets once the current price is adjusted to reflect market conditions. As shown in block 420, budgets of previous buyers are credited the unit difference in price between the current price and prices the previous buyers paid for the number of goods previously purchased. As current prices fall, higher bidders whose budgets previously might have been expended will have their budgets partially replenished. Therefore, the previous buyers will be able to acquire additional items at the current market rate. The previous buyers should be pleased that they can acquire additional items without increasing their budgets. The sellers also should be pleased. Allowing the higher bidders to further participate, even at an overall reduced price, prevents prices from declining sharply after higher bidders originally were eliminated.

Results of Auctions With Equilibrated Prices

FIGS. 5A, 5B, and 5C show results 510, 520, and 530, respectively, of auctions conducted according to flow diagram 400 of FIG. 4. As shown the results 510 of FIG. 5A, results for BIDDER A 510a show that BIDDER A offered a bid of 8.0¢ per impression 512a and set a budget of $300 514a. It may be noted that BIDDER A made the same bid 512a and submitted the same budget 514a as BIDDER A did in the example of a conventional auction described in FIGS. 3A and 3B.

Figure 1A:
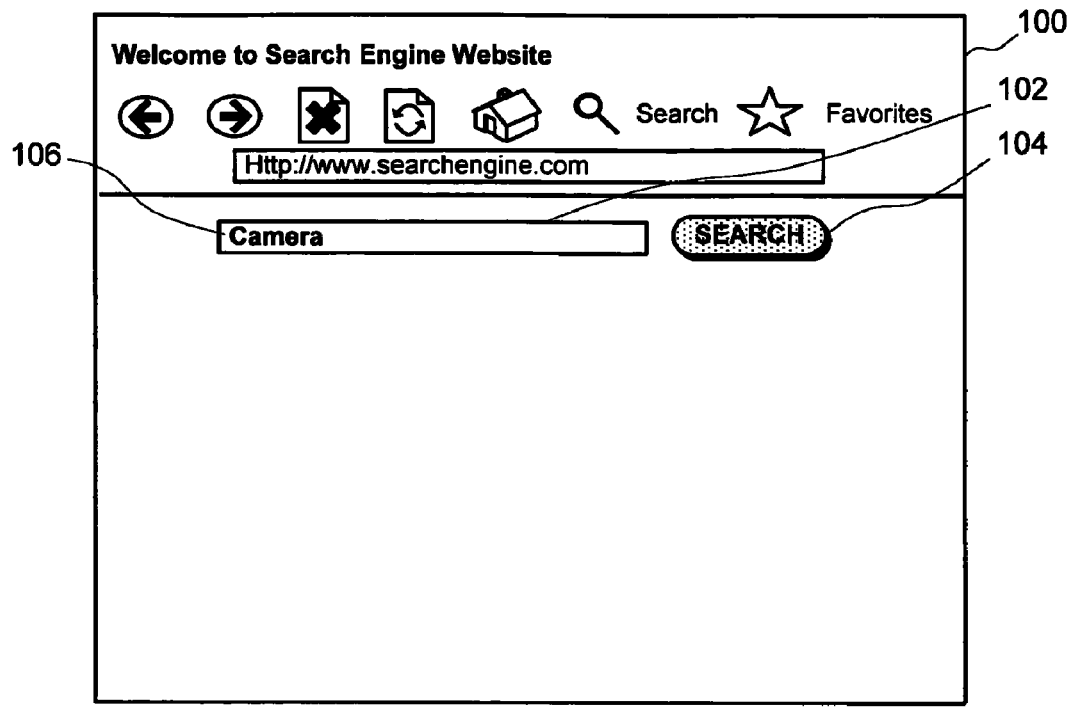
FIGS. 1A and 1B (Prior Art) are screens illustrating how a user's use of search engine page retrieves not only search results, but also results in a number of advertisements being presented to the user.
Figure 1B:
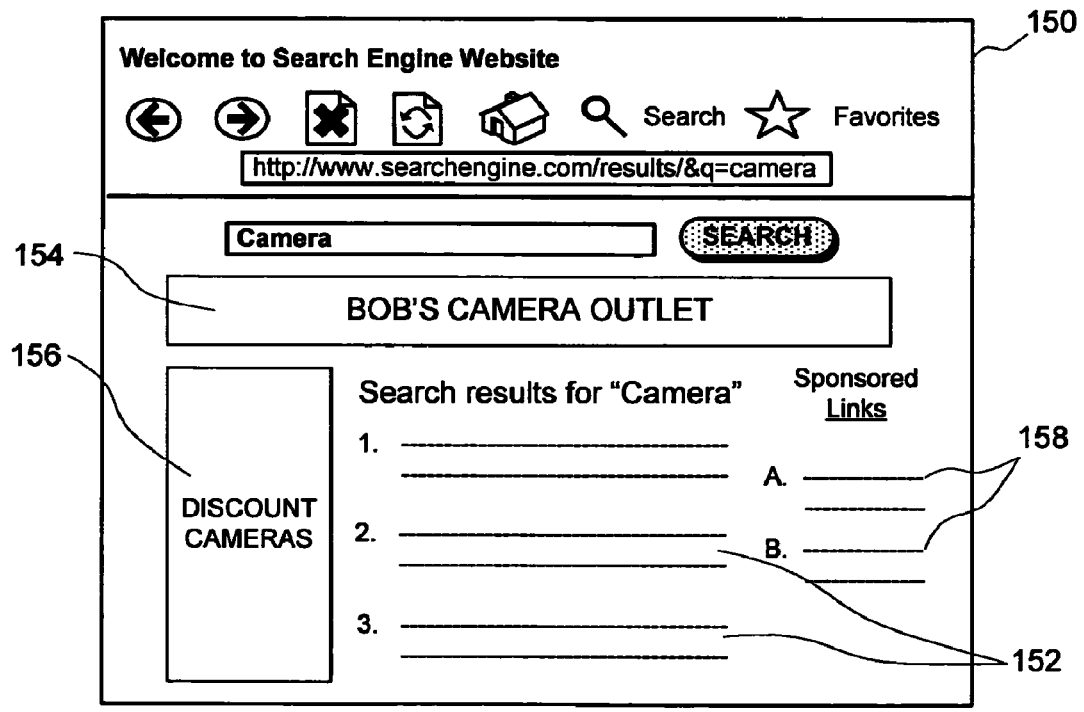
Figure 2:
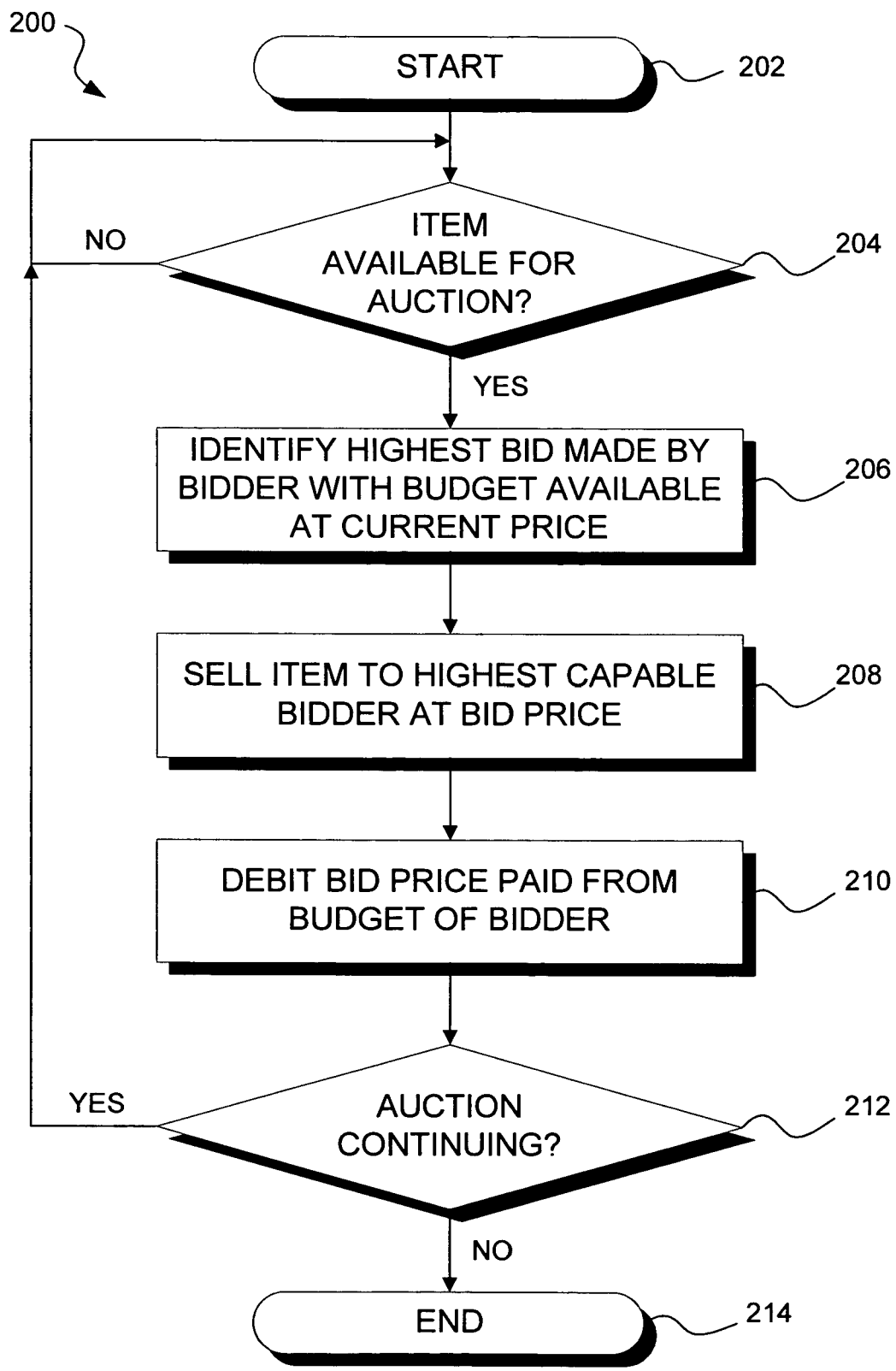
FIG. 2 (Prior Art) is a flow diagram illustrating the conventional auction of items where the supply of items is not known prior to the commencement of the auction.
Figure 3A:
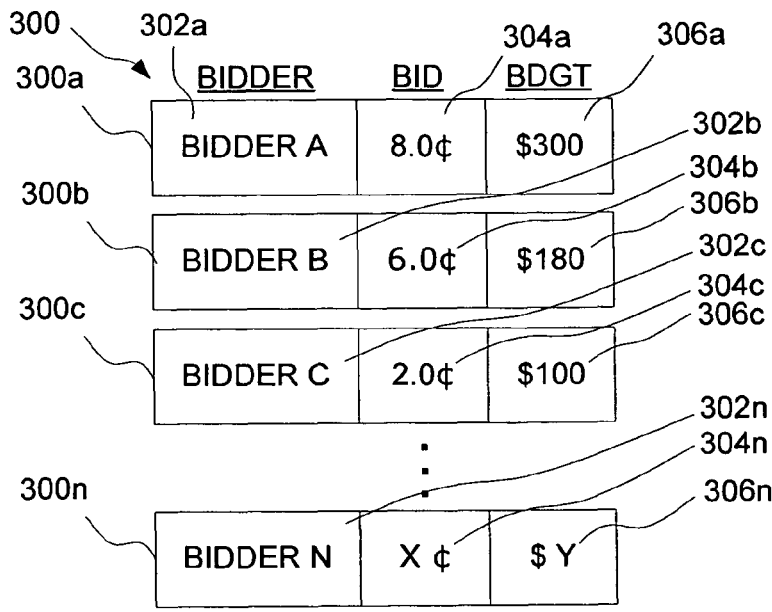
FIG. 3A (Prior Art) shows bids made by a plurality of bidders in a conventional auction, including prices bid and budgets set by the bidders.
Figure 3B:
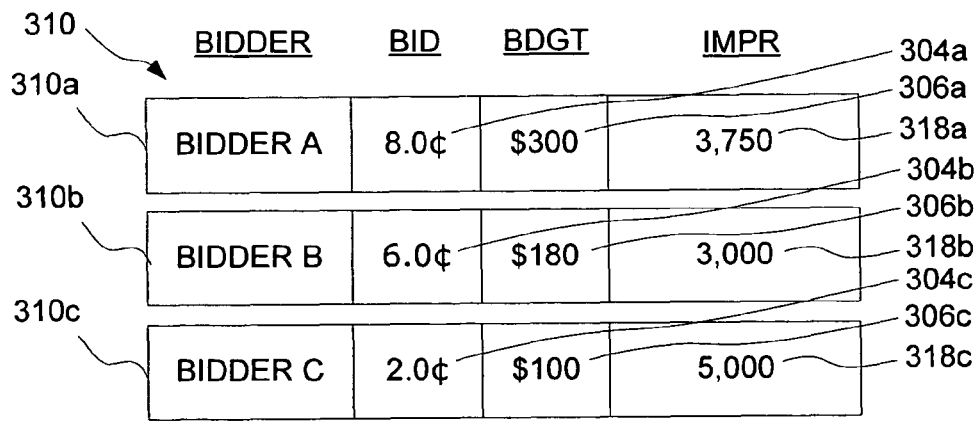
FIG. 3B (Prior Art) shows results of the auction according to the bids and budgets made by bidders as shown in FIG. 3A.
Figure 3C:
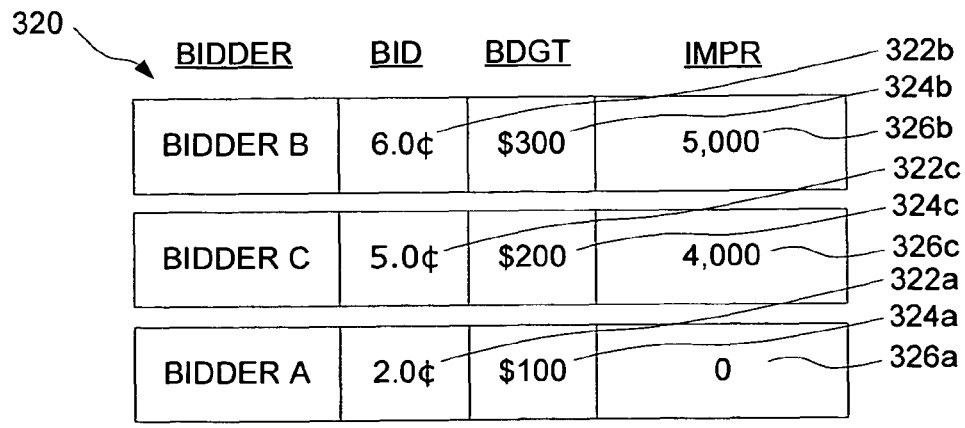
FIG. 3C (Prior Art) shows results of another auction according to bids and budgets made by bidders in response to the results of the auction shown in FIG. 3B.

However, in contrast to the results of the conventional auction of FIGS. 3A and 3B, where BIDDER A indeed paid 8.0¢ per impression and earned 3,750 impressions 318a, auction results for BIDDER A 510a show that BIDDER A was able to earn 5,000 impressions 516a. According to the exemplary mode of an auction process of FIG. 4, BIDDER A ultimately paid only 6.0¢ per impression 518a, allowing BIDDER A to purchase more impressions with the same budget. Results for BIDDER B 510b show that, once more, BIDDER B offered a bid of 6.0¢ per impression 512b and submitted a budget of $180 514b. Again, as in the case of the conventional auction, BIDDER B earned 3,000 impressions 516b and ultimately paid 6.0¢ per impression 518b. Both BIDDER A's price paid 518a and BIDDER B's price paid 518b proved to be 6.0¢ per impression. BIDDER B happened to bid at what proved to be the market price, and what BIDDER A paid was adjusted to reflect the market price.

Results for BIDDER C show that, as in the case of the conventional auction described in connection with FIGS. 3A and 3B, BIDDER C offered a bid of 2.00 per impression 512c and submitted a budget of $100 514c. However, unlike the conventional auction of FIGS. 3A and 3B, where BIDDER C reaped a windfall of 5,000 impressions 318c, here BIDDER C earned zero impressions 516c. Despite the low bid submitted by BIDDER C in the auction of FIGS. 3A and 3B, budgets of BIDDER A 306a and BIDDER B 306b were exhausted after a total of 6,750 impressions were auctioned. However, in the auction results 510 of FIG. 5A, because of credits applied to the budget of BIDDER A once the current price was adjusted, BIDDER A was able to earn additional impressions. Thus, BIDDER A is more satisfied with the results 500 of this auction than after the conventional auction of FIGS. 3A and 3B. Furthermore, the seller should be more satisfied because, as compared to the conventional auction of FIGS. 3A and 3B, the average price per impression sold was higher. The only participant less satisfied is BIDDER C, because the low bid of BIDDER C earned no windfall in the auction of FIG. 5A.

FIG. 5B shows results 520 of another auction conducted according to flow diagram 400 of FIG. 4. In results 520, it can be seen that the bids per impression 512a-512c and budgets submitted 514a-514c were the same for all participants as in the auction of FIG. 5A. This time, by contrast, many more items were auctioned as a result of increased demand. Increased demand resulted in a lower equilibrated price ultimately paid by all participants of 2.0¢ 528a-528c, rather than being paid by one low-bidding participant, as was the case in the conventional auction of FIGS. 3A and 3B.

The cause of the low price ultimately paid was the high supply of items, with BIDDER A earning 15,000 impressions 526a, BIDDER B earning 9,000 impressions 526b, and BIDDER C earning 1,000 impressions 526c. Thus, as in a market-driven economic situation, prices dropped with increased supply. Further in keeping with a market-driven economic situation, the buyers devoting the most resources acquired the most items. Further still, although the seller received a lower price per item, the seller was able to sell a much larger quantity of items, presumably offsetting the reduced marginal profit earned on the sale of each item.

It will be appreciated that adjustments in the price paid by bidders is not restricted to amounts actually bid by bidders in the auction, as shown in FIG. 5C. In results 530 of FIG. 5C, once again the bidders have offered the same bids 512a-512c and submitted the same budgets 514a-514c. In contrast to the examples of FIGS. 5A and 5B, the total impressions sold in the auction of FIG. 5C exceeded those of FIG. 5A, but were fewer than the total impressions sold in the auction of FIG. 5B.

During the course of the auction, BIDDER A earned 6,000 impressions 536a at a price of 5.00 per impression 538a, BIDDER B earned 3,600 impressions 536b also at a price of 5.00 per impression 538b, while BIDDER C earned zero impressions 536c. Although the current price fell below the most desirable bid 512a and next most desirable bid 512b, the market price was reached well before reaching the low bid 512c of BIDDER C. The current price suitably is incrementally adjusted by any predetermined amount, whether that predetermined amount is one cent, one tenth of one cent, or another increment.

In this particular example, upon adjusting the current price downwardly as BIDDER A's budget was repeatedly exhausted and replenished, BIDDER B was able to acquire a number of impressions while BIDDER A continued to earn impressions. After the current price reached 5.0¢ per impression, no other advertising opportunities became available, the auction period ended, or perhaps a seller reserve price was reached. Thus, the seller was able to sell its inventory at a higher average price than in the auction of FIG. 5B.

The seller may choose to reduce the current price incrementally, or choose to reduce the price to a next most desirable bidder's price, as is further described below. Reducing the price to that of the next most desirable bidder may result in sharp reductions in price. However, the possibility of such sharp reductions may entice more bidders to participate in the auction at the possibility of such a windfall. It should be appreciated, however, that even if the current price in an auction was reduced to a relatively low bid far below that of other bidders, the low bidder may have little chance to acquire items: once the current price is lowered to the low bid amount, budgets of higher bidders may be substantially replenished. Thus, the higher bidders may then be able to acquire the remaining number of items. In one exemplary embodiment, therefore, it is desirable to encourage higher bids by first auctioning additional items to the higher bidders, even at reduced prices.

Equilibrating Prices to Charged to Bidders Subject to Additional Limits

Figure 6:
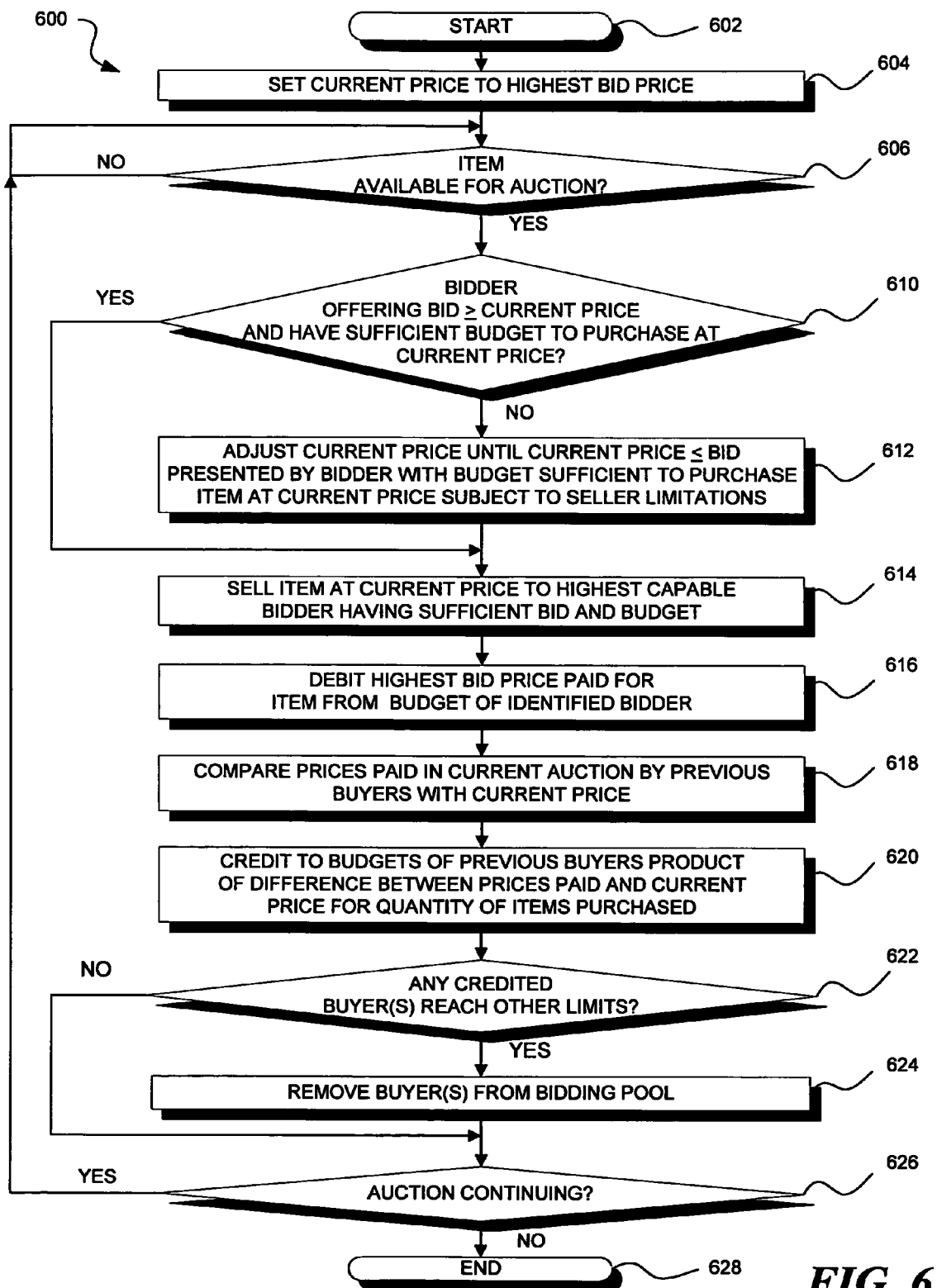
FIG. 6 is flow diagram describing another exemplary embodiment for auctioning items where prices paid by sellers are equilibrated.

Flow diagram 600 of FIG. 6 shows an additional exemplary mode for equilibrating auction prices paid by bidders subject to limitations set by bidders on a number of items the bidders wish to secure. For example, if a bidder is bidding on a number of advertising opportunities, the bidder may want to limit the number of advertising opportunities purchased so as not to saturate or inundate its target audience. For another example, an auctioning party may seek bids for the provision of goods and/or services, as when manufacturers seek the lowest bids for component parts or materials from suppliers. Thus, there may be a limit to the number of items a supplier can provide, regardless of the price. Flow diagram 600, like flow diagram 400 (FIG. 4) concerns a situation where the auctioning party is selling items and, thus, the most desirable bid is the highest bid. Nonetheless, the exemplary embodiment of flow diagram 600 is adaptable to auctions where the items auctioned by the auctioning party include opportunities to provide goods and services to the auctioning party, and the lowest bid is the most desirable.

Flow diagram 600 starts at block 602. At block 604, the current price to start the auction is set at the highest bid price. At decision block 606, it is determined if an item is available for auction. If it is determined that no item has become available for auction, flow diagram 600 loops to decision block 606 until an advertising opportunity becomes available.

Once an item is available for auction, at decision block 610, it is determined if there are bidders offering a bid at least as high as the current price while maintaining a budget sufficient to purchase an item at the current price. If not, at block 612, the current price is adjusted until the current price is less than or equal to the bid presented by a highest bidder with a budget sufficient to purchase the item at the newly adjusted current price. In contrast to flow diagram 400 (FIG. 4), where the current price was reduced incrementally, at block 612, the highest bidder that both offers a bid at least as high as the current price and has sufficient remaining budget to purchase an item at the current is identified. In other words, if the budget of the highest bidder has been exhausted, the item will be sold to the next highest bidder if that bidder has sufficient budget to cover the current price of the item, and so on. Adjusting the price to the price of the next bidder may change prices more suddenly. However, moving directly to the price of the next bidder potentially reduces the number of price adjustments being made before a bidder having a sufficient bid and budget is identified.

If a capable bidder is identified at decision block 610 or once the price is adjusted at block 612, at 614, the item is auctioned to the highest bidder of the capable bidders having both a sufficient bid and a sufficient budget. At block 616, the current price paid for the item is debited from the budget of the successful bidder.

At block 618, the prices paid in the current auction by buyers of previously auctioned items are compared with the current price. At block 620, the budgets of buyers of previous items are credited the product of the difference between the prices these buyers paid for the items and the current price and the quantity of items purchased. As a result, at block 620, the prices paid by all the buyers to this point in the auction are equilibrated to reflect a price dictated by supply and demand as determined up to this point of the auction.

At decision block 622, it is determined if any of the credited buyers have reached other stated limits. For example, in bidding on the auction, bidders may have been given an option to acquire additional items when their accounts were replenished. Some bidders may elect only to have their budget credited to reflect decreases in price, without buying additional items. Alternatively, buyers may submit both a budget and a limit to the number of items each was willing to acquire, as will be further described below. Such limits give bidders some additional flexibility which may entice additional bidders, or encourage bidders to submit higher bids if there is a possibility of getting a desired number of items while perhaps not spending all of their stated budgets. Allowing such a limit may reduce the ultimate price received by the seller, but the possibility of attracting more bidders or soliciting higher bids may encourage the seller to respect such limits.

If it is determined at decision block 622 that any buyers have reached stated limits, at block 624, these buyers are removed from the bidding pool for further items. If it has been determined at decision block 622 that no buyers have reached other stated limits, or once buyers who have reached stated limits have been removed from the bidding pool at block 624, at decision block 626, it is determined if the auction continues. As previously described, the auction may end if there are no other items to be auctioned, the auction period has ended, or if a seller price limit or reserve has been reached. In addition, the auction may not continue if all bidders have reached auction limits, including exhausting their auction budgets and/or having reached other stated limits. If it is determined at decision block 626 that the auction will not continue, flow diagram ends at block 628. Alternatively, if the auction continues, flow diagram loops to decision block 606 to await availability of a next item to be auctioned.

Results of Auctions with Equilibrated Prices Subject to Limits

FIGS. 7A and 7B show the results of two auctions where bidders are permitted to set limits on a number of items to be secured. In the results 700 of the auction of FIG. 7A, results for BIDDER A 700a show that BIDDER A offered a bid of 8.0¢ per impression 702a, and set a budget of $300 704a. BIDDER A also set a limit of 4,000 items to be acquired 706a.

Results for BIDDER B 700b show that BIDDER B offered a bid of 6.0¢ per impression 702b, set a budget of $180 704b, and set a limit of 3,000 items to be acquired 706b. Results for BIDDER C 700c show that BIDDER C offered a bid of only 2.0¢ per impression 702c, set a budget of $100 704c, but left blank a limit of the number of items to be acquired 706c, perhaps thinking it would be glad to take as many impressions as it might get at its low bid price, up to its budget of $100 704c.

Results for BIDDER A also show that BIDDER A ultimately paid 6.0¢ per impression 706a, and earned 4,000 impressions 710a, reaching its limit of 4,000 impressions 708a. Having reached its limit, when the current price eventually declined to 6.0¢ per impression, BIDDER A's cost for impressions earned was $240 712a. Results for BIDDER B show that BIDDER B also ultimately paid 6.0¢ per impression 708b, and earned 3,000 impressions 710b, reaching its limit of 3,000 impressions 706b. Because BIDDER B bid what turned out to be the ultimate price paid of 6.0¢, BIDDER B's cost for impressions earned was $180 712b, which was the same as its budget 704b. Thus, BIDDER A was able to earn its desired number of impressions at a price lower than it was willing to pay, so BIDDER A should be satisfied. BIDDER B was able to earn its desired number of impressions at a price lower than it was willing to pay, so BIDDER B should be satisfied, also. Seller may be dissatisfied in that BIDDER A paid less than it was willing to pay, but allowing BIDDER A to set limit 706a may have encouraged BIDDER A to bid, or to have bid higher than BIDDER A might have otherwise.

BIDDER C earned zero impressions 710c. It is possible that there were no additional items available for auction after the price reached 6.0¢, or BIDDER C's bid of 2.0¢ may have been below the seller's reserve price or limit.

In the results 720 of the auction of FIG. 7B, results for BIDDER A 720a show that BIDDER A once again offered a bid of 8.0¢ per impression 722a, set a budget of $300 724a, and set a limit of 4,000 items to be acquired 726a. Results for BIDDER B 720b show that BIDDER B also once again offered a bid of 6.0¢ per impression 722b, set a budget of $180 724b, and set a limit of 3,000 items to be acquired 726b. Results for BIDDER C 720c, however, show that while BIDDER C offered a bid of only 2.0¢ per impression, BIDDER C raised its budget to $500 724c, and again left blank a limit of the number of items to be acquired 726c. Exemplary embodiments of the auction process may allow providers to specify that bidders who offer less than a particular bid price may not be allowed to restrict their budgets and/or limits below set thresholds, affording the seller some possibility of greater revenue if supply should prove to be high.

Results 720 for the auction of FIG. 7B show the ultimate price paid by BIDDERS A, B, and C fell to 2.0¢ per impression 728a-728c. This may have been the result of adjusting a price to the level of the next highest bidder, (see FIG. 6) rather than reducing the price incrementally. BIDDER A again earned 4,000 impressions 730a, reaching its limit of 4,000 impressions 726a. Having reached its limit, when the current price eventually declined to 2.0¢ per impression, BIDDER A's cost for impressions earned was $80 732a. BIDDER B earned 3,000 impressions 730b, reaching its limit of 3,000 impressions 726b. Because the price fell to 2.0¢ per impression, BIDDER B's cost for impressions earned was $60 732b.

By contrast, either because BIDDER C's budget 724c was high by choice or by rule, and BIDDER C did not set a limit 726c by choice or by rule, BIDDER C earned 20,000 impressions 730c at a total cost of $400 732c. Thus, despite the lower price per impression as compared with results 700 auction of FIG. 7A, the seller reaped more revenue. Allowing bidders to set limits on a number of items to be secured even as the current price falls may encourage more bidders to take part or to bid higher. However, restricting limits or mandating certain thresholds for limits when a bidder bids below a certain amount may help protect the seller while also allowing higher bidders flexibility in limiting their participation in the auction.

Computing System for Implementing Exemplary Embodiments

Figure 8:
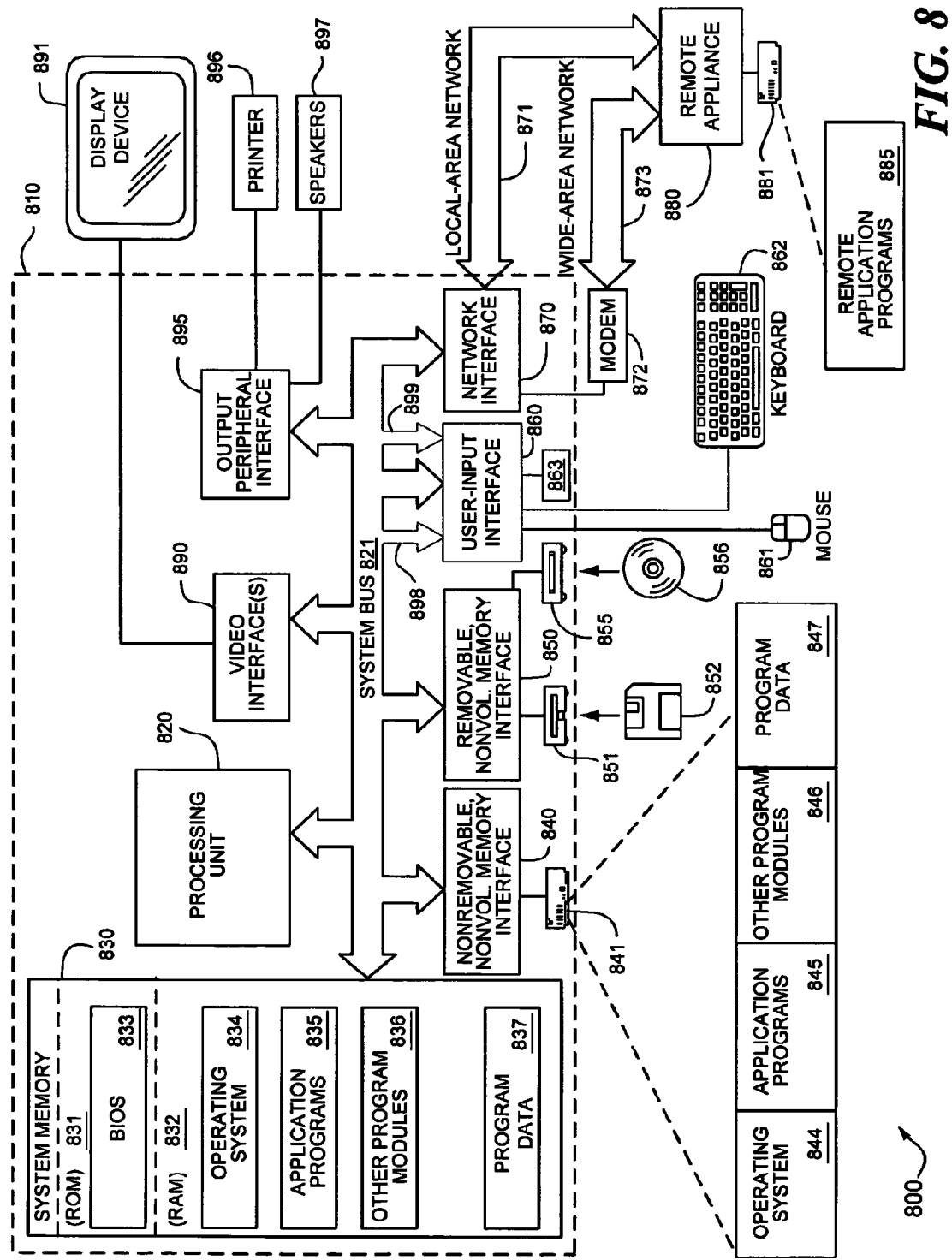
FIG. 8 is a block diagram of a computing-system environment suitable for use in equilibrating prices in an auction.

FIG. 8 illustrates an exemplary computing system 800 for implementing embodiments of the auction process. The computing system 800 is only one example of a suitable operating environment and is not intended to suggest any limitation as to the scope of use or functionality of exemplary embodiments of the auction process previously described or other embodiments. Neither should the computing system 800 be interpreted as having any dependency or requirement relating to any one or combination of components illustrated in the exemplary computing system 800.

The auction process may be described in the general context of computer-executable instructions, such as program modules, being executed on computing system 800. Generally, program modules include routines, programs, objects, components, data structures, etc., that perform particular tasks or implement particular abstract data types. Moreover, those skilled in the art will appreciate that the auction process may be practiced with a variety of computer-system configurations, including hand-held devices, multiprocessor systems, microprocessor-based or programmable-consumer electronics, minicomputers, mainframe computers, and the like. The auction process may also be practiced in distributed-computing environments where tasks are performed by remote-processing devices that are linked through a communications network. In a distributed-computing environment, program modules may be located in both local and remote computer-storage media including memory-storage devices.

With reference to FIG. 8, an exemplary computing system 800 for implementing the auction process includes a computer 810 including a processing unit 820, a system memory 830, and a system bus 821 that couples various system components including the system memory 830 to the processing unit 820.

Computer 810 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 810. The system memory 830 includes computer-storage media in the form of volatile and/or nonvolatile memory such as ROM 831 and RAM 832. A Basic Input/Output System 833 (BIOS), containing the basic routines that help to transfer information between elements within computer 810 (such as during start-up) is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer-storage media. By way of example only, FIG. 8 illustrates a hard disk drive 841 that reads from or writes to nonremovable, nonvolatile magnetic media, a magnetic disk drive 851 that reads from or writes to a removable, nonvolatile magnetic disk 852, and an optical-disc drive 855 that reads from or writes to a removable, nonvolatile optical disc 856 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 841 is typically connected to the system bus 821 through a nonremovable memory interface such as interface 840. Magnetic disk drive 851 and optical dick drive 855 are typically connected to the system bus 821 by a removable memory interface, such as interface 850.

The drives and their associated computer-storage media discussed above and illustrated in FIG. 8 provide storage of computer-readable instructions, data structures, program modules and other data for computer 810. For example, hard disk drive 841 is illustrated as storing operating system 844, application programs 845, other program modules 846, and program data 847. Note that these components can either be the same as or different from operating system 834, application programs 835, other program modules 836, and program data 837. Typically, the operating system, application programs, and the like that are stored in RAM are portions of the corresponding systems, programs, or data read from hard disk drive 841, the portions varying in size and scope depending on the functions desired. Operating system 844, application programs 845, other program modules 846, and program data 847 are given different numbers here to illustrate that, at a minimum, they can be different copies. A user may enter commands and information into the computer 810 through input devices such as a keyboard 862; pointing device 861, commonly referred to as a mouse, trackball or touch pad; a wireless-input-reception component 863; or a wireless source such as a remote control. Other input devices (not shown) may include a microphone, joystick, game pad, satellite dish, scanner, or the like. These and other input devices are often connected to the processing unit 820 through a user-input interface 860 that is coupled to the system bus 821 but may be connected by other interface and bus structures, such as a parallel port, game port, IEEE 8394 port, or a universal serial bus (USB) 898, or infrared (IR) bus 899. As previously mentioned, input/output functions can be facilitated in a distributed manner via a communications network.

A display device 891 is also connected to the system bus 821 via an interface, such as a video interface 890. Display device 891 can be any device to display the output of computer 810 not limited to a monitor, an LCD screen, a TFT screen, a flat-panel display, a conventional television, or screen projector. In addition to the display device 891, computers may also include other peripheral output devices such as speakers 897 and printer 896, which may be connected through an output peripheral interface 895.

The computer 810 will operate in a networked environment using logical connections to one or more remote computers, such as a remote computer 880. The remote computer 880 may be a personal computer, and typically includes many or all of the elements described above relative to the computer 810, although only a memory storage device 881 has been illustrated in FIG. 8. The logical connections depicted in FIG. 8 include a local-area network (LAN) 871 and a wide-area network (WAN) 873 but may also include other networks, such as connections to a metropolitan-area network (MAN), intranet, or the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the network interface 870, or other appropriate mechanism. Modem 872 could be a cable modem, DSL modem, or other broadband device. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary, and other means of establishing a communications link between the computers may be used.

Although many other internal components of the computer 810 are not shown, those of ordinary skill in the art will appreciate that such components and the interconnections are well-known. For example, including various expansion cards such as television-tuner cards and network-interface cards within a computer 810 is conventional. Accordingly, additional details concerning the internal construction of the computer 810 need not be disclosed in describing exemplary embodiments of the auction process.

When the computer 810 is turned on or reset, the BIOS 833, which is stored in ROM 831, instructs the processing unit 820 to load the operating system, or necessary portion thereof, from the hard disk drive 841 into the RAM 832. Once the copied portion of the operating system, designated as operating system 844, is loaded into RAM 832, the processing unit 820 executes the operating system code and causes the visual elements associated with the user interface of the operating system 834 to be displayed on the display device 891. Typically, when an application program 845 is opened by a user, the program code and relevant data are read from the hard disk drive 841 and the necessary portions are copied into RAM 832, the copied portion represented herein by reference numeral 835.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A tangible computer storage medium having computer-executable instructions that, when executed, directs a computer to perform a method for establishing an auction price for a quantity of items, the method comprising:
   determining that an opportunity to auction at least one of the items has been triggered by a network user using a search term for which one or more advertisers have bid wherein the quantity of items is not predetermined;
   receiving from each of a plurality of bidders a bid and an account limit;
   setting a current price equal to a first price based at least in part on a most desirable bid and one or more of the next most desirable bids;
   selling a first quantity of items to a bidder submitting the most desirable bid at the current price until the account limit of the bidder is reached;
   debiting from the bidder the current price for each of the first quantity of items;
   adjusting the current price to a lower price;
   crediting to the bidder, after a second quantity of items is purchased by another bidder at the current price, a difference between the first price and the current price for each of the first quantity of items sold to the bidder at the first price;
   selling additional items to the plurality of bidders that purchased at least one of the first or second quantity of items, wherein the additional items are sold at the lower price to the plurality of bidders in order of desirability of the bids received previously from each of the plurality of bidders such that the bidder that submitted the most desirable bid is sold at least a portion of the additional items before others of the plurality of bidders.

2. The medium of claim 1, wherein the most desirable bid comprises
   a highest bid when an auctioning party seeks to sell a quantity of items.

3. The medium of claim 1, wherein the items include advertisements presented via an Internet.

4. The medium of claim 1, wherein the current price is repeatedly adjusted until one of:
   an end of an auction period is reached;
   the quantity of items available in the auction is exhausted;
   each of the plurality of account limits for each of the plurality of bidders is reached; or
   a price limit set by the auctioning party is reached.

5. The medium of claim 1, wherein adjusting the current price to a lower price includes one of:
   adjusting the current price by an incremental amount; or
   adjusting the current price to a next most desirable bid.

6. The medium of claim 1, wherein the account limit includes a first budget specifying what the bidder is willing to invest in the auction, and, upon crediting to the bidder causing the first budget to regain at least the current price, selling at least one additional item to the bidder at the current price.

7. The medium of claim 6, wherein the method further comprises selling the at least one additional item to the bidder at the current price when the bidder has not precluded acquisition of additional items by one of:
   specifying that the bidder will accept no additional items after the first budget has been exhausted a first time; or
   acquiring a number of items the bidder has specified constitutes a maximum number of items to be acquired.

8. A tangible computer storage medium having computer-executable instructions that, when executed, directs a computer to perform a method for establishing an auction price for a quantity of advertising opportunities to be sold to a plurality of bidders, the method comprising:
   determining that an opportunity to auction at least one of the advertising opportunities has been triggered by a network user using a search term for which one or more advertisers have bid wherein the quantity of items is not predetermined;
   receiving from each of the plurality of bidders a bid and a budget allotted to the auction by each of the plurality of bidders;

establishing a current price based on at least one of a highest bid and at least one of a plurality of next highest bids;

selling a first quantity of advertising opportunities to a bidder submitting the highest bid at the current price until a first budget of the bidder is reached;

reducing the current price;

crediting the bidder, after a second quantity of items is purchased by another bidder at the current price, a difference between the first price and the current price for each of the first quantity of advertising opportunities sold to the bidder at the first price;

selling additional advertising opportunities to the bidders that purchased at least one of the first or second quantity of advertising opportunities, wherein the additional advertising opportunities are sold at the reduced current price to the plurality of bidders in order of desirability of bids previously received from each of the plurality of bidders such that the bidder submitting the highest bid is sold at least one additional advertising opportunity before others of the plurality of bidders.

9. The medium of claim 8, wherein the advertising opportunities include Internet advertising opportunities each including at least one of:

a banner ad;

a pop-up ad; or a sponsored link.

10. The medium of claim 8, wherein lowering the current price includes one of continually lowering the current price by a predetermined incremental amount and lowering the current price to a level of a next highest bid until one of:

an end of an auction period is reached;

the quantity of advertising opportunities available in the auction is exhausted;

each of the plurality of budgets for each of the plurality of bidders is exhausted;

each of a plurality of limits specifying a maximum number of advertising opportunities each of the plurality of bidders will accept has been reached; or a price limit set by the auctioning party is reached.

11. The medium of claim 10, wherein the method further comprises:

monitoring the first budget; and upon crediting to the bidder causing the first budget to regain a level sufficient to allow the bidder to purchase at least one additional advertising opportunity at the current price, selling the at least one additional advertising opportunity to the bidder at the current price.

12. A system for adapting auction prices for auctioning a quantity of items, the system comprising one or more computers programmed to perform actions comprising:

determining that an opportunity to auction at least one of the items has been triggered by a network user using a search term for which one or more advertisers have bid wherein the quantity of times is not predetermined at a beginning of an auction;

receiving from each of a plurality of bidders a bid and an account limit specifying a budget allocated to the auction and optionally specifying an acceptable number of items a bidder is willing to acquire in the auction;

setting a current price equal to a first price based on at least one of a plurality of most desirable bids;

selling a first quantity of items to a bidder submitting the most desirable bid at the current price until a first budget of the bidder is reached;

debiting from the bidder the current price for each of the first quantity of items;

adjusting the current price to a first lower price;

crediting to the bidder, after a second quantity of items is purchased by another bidder at the current price, a first difference between the first lower price and the current price for each of the first quantity of items sold to the bidder at the first lower price;

selling at least one additional item to the bidder at the current price;

debiting from the bidder the current price for the additional item;

adjusting the current price to a second lower price lower than the first lower price;

crediting to the bidder, after a third quantity of items is purchased by another bidder at the current price, a second difference between the second lower price and the current price for the additional item; and selling additional items to the plurality of bidders that purchased at least one of the first, second, or third quantity of items, wherein the additional items are sold at the second lower price to the plurality of bidders in order of desirability of the bids received previously from each of the plurality of bidders such that the bidder that submitted the most desirable bid is sold at least a portion of the additional items before others of the plurality of bidders.

* * * * *